H. L. PALMER,

Assignor, by mesne assignments, to B C. FAUROT, Trustee.

Apparatus for Lining Paper-Board.

No. 8,883. Reissued Sept. 2, 1879.

Witnesses,
W. H. H. Knight
W. Blackstock.

Inventor:
Henry L. Palmer,
By L. Hill
His Atty.

UNITED STATES PATENT OFFICE.

HENRY L. PALMER, OF BROOKLYN, NEW YORK, ASSIGNOR, BY MESNE ASSIGNMENTS, TO B. C. FAUROT, TRUSTEE.

IMPROVEMENT IN APPARATUS FOR LINING PAPER-BOARD.

Specification forming part of Letters Patent No. 87,359, dated March 2, 1869; Reissue No. 4,951, dated June 18, 1872; Reissue No. 5,471, dated July 1, 1873; Reissue No. 7,517, dated February 20, 1877; Reissue No. 8,883, dated September 2, 1879; application filed July 31, 1879.

*To all whom it may concern:*

Be it known that I, HENRY L. PALMER, of Brooklyn, Kings county, State of New York, formerly of Stillwater, Saratoga county, State of New York, have invented a new and useful invention for the purpose of uniting paper to what is known in trade and mechanical uses as "pasteboard," whether made of straw or other materials, of which the following is a specification.

Previous to this invention continuous sheets of paper-board had been lined with continuous sheets of thin paper by machinery, which applied the paste to the thin paper, united the same with the board, and then dried the united layers by means of a drying-cylinder; also, board had been built up of continuous sheets of paper pasted and pressed together by machinery; also, board had been built up of continuous sheets of wet or damp pulp pressed together and afterward dried; but prior to my invention no machine had ever been organized capable of practically lining the small commercial sheets of board with thin lining-paper by machinery. This work has been heretofore done by hand. The drying has been accomplished by exposure to the atmosphere, and the work, when done, is liable to warp and to be rough and uneven, and the process is slow and expensive.

I propose to save by this invention this hand manipulation, with an economy in the cost of paper and labor, and with the production of the material in a superior condition.

My invention therefore consists, first, in a machine organized for and capable of lining the short commercial sheets of straw-board or paper-board or other similar fabric with thin lining-paper or similar thin fabric; and, secondly, in certain improvements in the arrangement and combination of the mechanical devices employed in the machine; and I do hereby declare that the following is a true and full description of the construction and operation of the invention, reference being had to the annexed drawings, making part of this specification.

Figure 1:
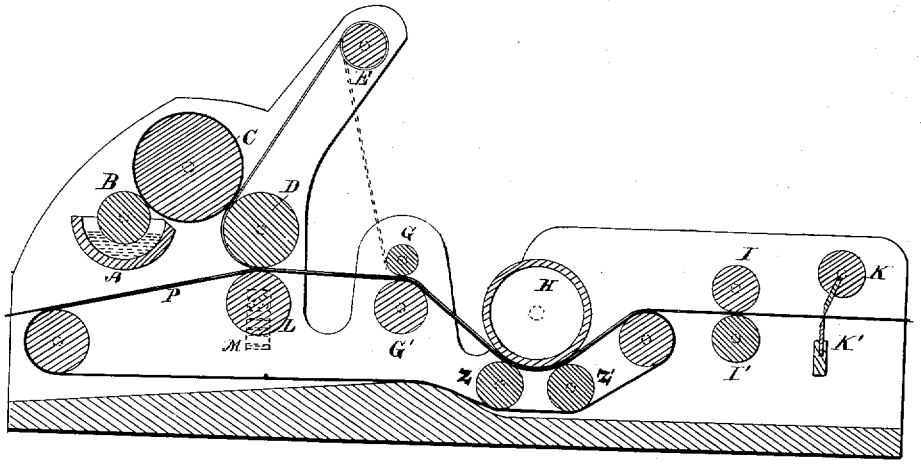
Figure 2:
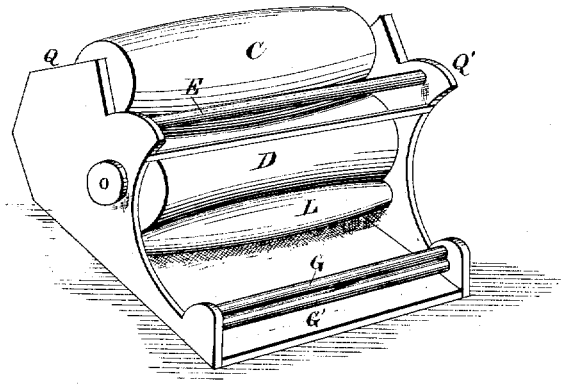

Figure 1 represents a vertical longitudinal section of the machine; and Fig. 2 represents a perspective view of a portion of the machine. Similar letters of reference indicate the same parts in both figures.

A is a paste-reservoir. B is a paste-roll, arranged to revolve in said reservoir. C is a distributing-roll, arranged to revolve with the paste-roll B, and separated from said roll by a film of paste. D is a feeding press-roll, for pressing, pasting, and feeding the thin lining-paper. It is caused to revolve on its axis by the motive power of the machine by means of a belt, its circumference moving at substantially the same speed as the pressing or uniting roll L, or the drying-cylinder H, and in connection with the distributing-roll C, between which and the roll C the paper passes to receive the paste from roll C, and by the resistance of which the paste is forced against the paper and the paper is fed forward.

L is a self-adjusting pressing-roll under the roll D, between the upper surface of which and the lower surface of the roll D the two layers of paper and a continuous belt of felt, P, pass, and by the pressure of which the two layers of paper are united. The adjusting-springs are seen at M. G G′ are also pressing-rollers, between which the felt and the two layers of paper are caused to pass. H is a drying cylinder or roll, into which steam or heated air is introduced for the purpose of drying the two layers of paper as they pass under its surface, being pressed against it by pressing-rolls Z Z′. I I′ are calender-rolls, and K K′ are revolving knives for cutting the united and dried paper into sheets.

The roll of thin paper to be supplied with paste is hung on the roll E, which has bearings in the sides of the frame.

I do not confine myself to the use of concave and convex rollers B C D L, but can use cylindrical in their place.

To revolve the rolls, I have applied pulleys on the end of the shafts to which the rolls D and H and K are attached, and have connected them by means of belts, the other rolls being revolved by frictional contact with the felt or paper, or the adjacent rolls.

The operation is as follows: Paste is supplied to the reservoir A is such quantity and consistency that it will be taken up by the roll B as it revolves and be carried between the rollers B and C, where it is pressed and deposited on the surface of the roll C in a uniform film. It is then carried on the surface of the roll C to the paper, which is passing between rolls D and C, from a roll hung on the shaft E, and deposited on it by the pressure of the roll C against the paper resisted by the roll D. The pasteboard is fed in a continuous ribbon or in sheets, and carried forward by the felt P to the under side of the roller D, where it meets the paper. The two materials are then passed through with the felt between rollers D and L, the spring M accommodating for any difference there may be in the thickness of the pasteboard or paper. The object of the concave and convex rollers is seen at this point by giving a rounding or convex form to the surface to which the paper is applied to compensate for any contraction of the wet paper. The material then passes forward in the direction indicated by the arrows between rollers G G′, where it receives additional pressure around the drying-cylinder H, where it is dried; thence through the calenders I I′, where it is smoothed and straightened; thence between knives K K′, which will sever the sheets or cut to any desired size.

If it be desired to paste the board instead of the paper, it will be done by changing the direction of the paper, and, as in this figure, bring it directly from E to G G′, as indicated by the dotted lines. The pasteboard coming from between rollers D and L, where it has been pasted, meets the paper between G G′, after which it will proceed as in Fig. 1.

I do not claim the drying-cylinder H, calenders I I′, or the knives K K′; but I claim them only in combination with the other parts specified.

It will be seen from the above description of the construction and operation of my improved machine that said machine is capable both of lining continuous sheets of straw-board or other thick material, and also the short commercial sheets of such material, and that its organization is especially adapted to the latter purpose. It will also be observed that for such last-named purpose the employment of a suitable guide or platform to support, guide, and direct the separate sheets of thick material in between the pressing or uniting rolls D L, and also of a guide or conveyer to support and carry said sheets from said rolls to the drying-rolls, is an essential requisite, and that, in connection with such guides and supports, for the purpose of properly holding and guiding the sheets of thick board, and in connection with means for applying the paste, pressing the two sheets together, and subsequently drying them, some suitable means for supporting the thin lining-paper and guiding it properly to the apparatus which applies the paste to it, and to the straw-board to which it is to be united, is also an essential requisite.

In the machine herein shown the guiding of the thick board is accomplished by the felt P, which, for that purpose, is arranged in so nearly a horizontal position as to perform the function of supporting the separate sheets as they are fed into and through the machine, which is also essential where the thick paper is not continuous; but if the thin lining-paper be fed in continuous sheets, it is not necessary to guide it from or upon a horizontal support, as it will, in that case, be properly directed and guided from a roll placed in any suitable position, as at E.

Having now described said improvements, what I claim, and desire to secure by Letters Patent, is—

1. The combination, in a straw-board-lining machine, of a paste-reservoir, a paste-roll, a distributing-roll, and a feeding press-roll, for feeding, pasting, and pressing the thin lining-paper, with a roll for bringing the straw-board in contact with the lining-paper and uniting them, all constructed and operating substantially in the manner and for the purposes set forth.

2. The combination, in a straw-board-lining machine, of a paste-reservoir, a paste-roll, a distributing-roll, and a feeding press-roll, for feeding, pasting, and pressing the thin lining-paper, with a roll for bringing the straw-board in contact with the lining-paper and uniting them, and a drying-cylinder, all constructed and operating substantially in the manner and for the purposes set forth.

3. The combination of pasting mechanism with press-rolls and drying-rolls, and with suitable means for supporting and guiding the sheets of paper-board and the lining-paper in their passage to and through the machine, whereby the short commercial sheets of thick board are enabled to be practically fed to and through the machine and lined with thin fabric on their passage through it, substantially as described.

HENRY L. PALMER.

Witnesses:
ROBERT H. GRIFFITHS,
E. A. DUNHAM, Jr.